United States Patent [19]

Mayfield

[11] Patent Number: 5,664,147
[45] Date of Patent: Sep. 2, 1997

[54] SYSTEM AND METHOD THAT PROGRESSIVELY PREFETCHES ADDITIONAL LINES TO A DISTRIBUTED STREAM BUFFER AS THE SEQUENTIALITY OF THE MEMORY ACCESSING IS DEMONSTRATED

[75] Inventor: Michael John Mayfield, Austin, Tex.

[73] Assignee: International Business Machines Corp., Armonk, N.Y.

[21] Appl. No.: 519,031

[22] Filed: Aug. 24, 1995

[51] Int. Cl.$^6$ .................................................. G06F 12/08
[52] U.S. Cl. .......................................... 711/137; 711/122
[58] Field of Search ............................. 395/464, 872, 395/421.03, 460, 449, 445

[56] References Cited

U.S. PATENT DOCUMENTS

| | | | |
|---|---|---|---|
| 4,980,823 | 12/1990 | Liu | 395/463 |
| 5,146,578 | 9/1992 | Zangenehpour | 395/464 |
| 5,317,718 | 5/1994 | Jouppi | 395/464 |
| 5,345,560 | 9/1994 | Miura et al. | 395/250 |
| 5,353,419 | 10/1994 | Touch et al. | 395/582 |
| 5,364,391 | 11/1994 | Westberg | 395/464 |
| 5,371,870 | 12/1994 | Goodwin et al. | 395/872 |
| 5,381,539 | 1/1995 | Yanai et al. | 395/460 |
| 5,388,247 | 2/1995 | Goodwin et al. | 395/470 |
| 5,473,764 | 12/1995 | Chi | 395/383 |
| 5,490,113 | 2/1996 | Tatosian et al. | 365/189.05 |
| 5,537,568 | 7/1996 | Yanai et al. | 394/445 |
| 5,566,324 | 10/1996 | Kass | 395/487 |
| 5,586,294 | 12/1996 | Goodwin et al. | 395/464 |
| 5,586,295 | 12/1996 | Tran | 395/464 |
| 5,588,128 | 12/1996 | Hicok et al. | 395/414 |
| 5,600,817 | 2/1997 | Macon, Jr. et al. | 395/464 |

FOREIGN PATENT DOCUMENTS

WO92/20027  11/1992  Sweden .................... G06F 12/08

OTHER PUBLICATIONS

Dahlgren and Stenstrom, "Effectiveness of Hardware-Based Stride and Sequential Prefetching in Shared-Memory Multiprocessors", High Performance Computer Architecture, 1995 Symposium, pp. 68-77 Feb. 1995.

Chen and Baer, "Effective Hardware-Based Data Prefetching for High-Performance Processors", IEEE Transactions on Computers, V. 44, No. 5, pp. 609-623 May 1995.

Chiueh, Tzi-cker, "Sunder: A Programmable Hardware Prefetch Architecture for Numerical Loops", Supercomputing '94, pp. 488-497 1994.

Farkas, Jouppi, and Chow, "How Useful Are Non-blocking Loads, Stream Buffers and Speculative Execution in Multiple Issue Processors", High Performance Computer Architecture, 1995 Symposium, pp. 78-89 Feb. 1995.

Dahlgren et al., "Sequential Hardware Prefetching in Shared-Memory Multiprocess", IEEE Transactions on Parallel and Distributed Systems, vol. 6, No. 7, pp. 733-746. (Note p. 733, Manuscript received Nov. 3, 1993.) Jul. 1995.

Evaluating Stream Buffers as a Secondary Cache Replacement, S. Palacharla and R. Kessler, 1994 IEEE International Symposium on Computer Architecture, 1063-6897/94, pp. 24-33 (1994).

United States Patent Application Serial No. 08/442,740.

*Primary Examiner*—Tod R. Swann
*Assistant Examiner*—Keith W. Saunders
*Attorney, Agent, or Firm*—Kelly K. Kordzik; Winstead Sechrest & Minick P.C.; Mark E. McBurney

[57] ABSTRACT

Within a data processing system implementing L1 and L2 caches and stream filters and buffers, prefetching of cache lines is performed in a progressive manner. In one mode, data may not be prefetched. In a second mode, two cache lines are prefetched wherein one line is prefetched into the L1 cache and the next line is prefetched into a stream buffer. In a third mode, more than two cache lines are prefetched at a time. As a result, additional cache lines are progressively prefetched to a data cache as the sequentiality of the accessing of cache lines in memory is demonstrated through sequential addressing requests along a data stream. Furthermore, the stream is physically distributed. In other words, at least one line, but not all lines, of the stream are placed within the cache.

11 Claims, 9 Drawing Sheets

SYSTEM AND METHOD THAT PROGRESSIVELY PREFETCHES ADDITIONAL LINES TO A DISTRIBUTED STREAM BUFFER AS THE SEQUENTIALITY OF THE MEMORY ACCESSING IS DEMONSTRATED

CROSS-REFERENCE TO RELATED APPLICATIONS

This application for patent is related to the following applications for patent filed concurrently herewith:

MODIFIED L1/L2 CACHE INCLUSION FOR AGGRESSIVE PREFETCH, U.S. patent application Ser. No. 08/518,348;

STREAM FILTER, U.S. patent application Ser. No. 08/519,032;

CACHE DIRECTORY FIELD FOR INCLUSION, U.S. patent application Ser. No. 08,518,347.

These applications for patent are hereby incorporated by reference herein as if fully set forth herein.

TECHNICAL FIELD OF THE INVENTION

The present invention relates in general to data processing systems, and in particular, to a system and method for implementing a progressive prefetching of data with respect to a data cache.

BACKGROUND OF THE INVENTION

A special very high-speed memory is sometimes used to increase the speed of processing within a data processing system by making current programs and data available to a processor ("CPU") at a rapid rate. Such a high-speed memory is known as a cache and is sometimes employed in large computer systems to compensate for the speed differential between main memory access time and processor logic. Processor logic is usually faster than main memory access time with a result that processing speed is mostly limited by the speed of main memory. A technique used to compensate for the mismatch in operating speeds is to employ an extremely fast, small memory between the CPU and main memory whose access time is close to processor logic propagation delays. It is used to store segments of programs currently being executed in the CPU and temporary data frequently needed in the present calculations. By making programs (instructions) and data available at a rapid rate, it is possible to increase the performance rate of the processor.

Analysis of a large number of typical programs has shown that the references to memory at any given interval of time tend to be confined within a few localized areas in memory. This phenomenon is known as the property of "locality of reference." The reason for this property may be understood considering that a typical computer program flows in a straight-line fashion with program loops and subroutine calls encountered frequently. When a program loop is executed, the CPU repeatedly refers to the set of instructions in memory that constitute the loop. Every time a given subroutine is called, it's set of instructions are fetched from memory. Thus, loops and subroutines tend to localize the reference to memory for fetching instructions. To a lesser degree, memory references to data also tend to be localized. Table look-up procedures repeatedly refer to that portion in memory where the table is stored. Iterative procedures refer to common memory locations and array of numbers are confined within a local portion of memory. The result of all these observations is the locality of reference property, which states that, over a short interval of time, the addresses of instructions generated by a typical program refer to a few localized areas of memory repeatedly while the remainder of memory is accessed relatively infrequently.

If the active portions of the program and data are placed in a fast small memory, the average memory access time can be reduced, thus reducing the total execution time of the program. Such a fast small memory is referred to as a cache memory as noted above. The cache memory access time is less than the access time of main memory often by a factor of five to ten. The cache is the fastest component in the memory hierarchy and approaches the speed of CPU components.

The fundamental idea of cache organization is that by keeping the most frequently accessed instructions and data in the fast cache memory, the average memory access time will approach the access time of the cache. Although the cache is only a small fraction of the size of main memory, a large fraction of memory requests will be found in the fast cache memory because of the locality of reference property of programs.

The basic operation of the cache is as follows. When the CPU needs to access memory, the cache is examined. If the word is found in the cache, it is read from the fast memory. If the word addressed by the CPU is not found in the cache, the main memory is accessed to read the word. A block of words containing the one just accessed is then transferred from main memory to cache memory. In this manner, some data is transferred to cache so that future references to memory find the required words in the fast cache memory.

The average memory access time of the computer system can be improved considerably by use of a cache. The performance of cache memory is frequently measured in terms of a quantity called "hit ratio." When the CPU refers to memory and finds the word in cache, it is said to produce a "hit." If the word is not found in cache, then it is in main memory and it counts as a "miss." If the hit ratio is high enough so that most of the time the CPU accesses the cache instead of main memory, the average access time is closer to the access time of the fast cache memory. For example, a computer with cache access time of 100 ns, a main memory access time of 1,000 ns, and a hit ratio of 0.9 produces an average access time of 200 ns. This is a considerable improvement over a similar computer without a cache memory, whose access time is 1,000 ns.

In modern microprocessors, the processor cycle time continues to improve with technology evolution. Also, design techniques of speculative execution, deeper pipelines, more execution elements and the like continue to improve the performance of the microprocessor. The improved performance puts a heavier burden on the memory interface since the processors demand more data and instructions from memory to feed the microprocessor. Large on-chip caches (L1 caches) are implemented to help reduce the memory latency, and they are often augmented by larger off-chip caches (L2 caches).

Prefetching techniques are often implemented to try to supply memory data to the L1 cache ahead of time to reduce latency. Ideally, a program would prefetch data and instructions far enough in advance that a copy of the memory data would always be in the L1 cache when the processor needed it.

The problem is that microprocessor architectures do not provide enough advance information to explicitly determine the data addresses that might be needed in all cases. As an example, the address for a data operand in memory is itself in memory and must be fetched by a first instruction to be used by the memory instruction. With such a sequence, the processor does not have the address in advance in order to perform a prefetch.

Prefetching of instructions and/or data is well-known in the art. However, existing prefetching techniques often prefetch instructions and/or data prematurely. The problems with prefetching and then not using the prefetched instructions and/or data are that (1) the prefetch data may have displaced data needed by the processor, and (2) the prefetch memory accesses may have caused subsequent processor cache reloads to wait for the prefetch accesses, thus increasing the latency of needed data. Both of these effects lower the efficiency of the CPU. Thus, what is needed in the art is an improved prefetching technique that reduces the latency of data and instruction accesses to the L1 cache due to cache misses without lowering the performance of the microprocessor.

SUMMARY OF THE INVENTION

It is an object of the present invention to use a stream filter in conjunction with L1 and L2 caches in a microprocessor to provide prefetched data from memory to reduce data latency in a microprocessor system.

It is also an object of this invention to use a unique stream filter apparatus capable of supporting multiple streams simultaneously and progressively incrementing the prefetch data to control the depth of prefetching.

The present invention utilizes three progressive prefetch modes: normal, Data Prefetch "DP"), and Blast. In normal mode, data is not prefetched. In Data Prefetch mode, two cache lines are prefetched, one line to the L1 cache, and one line to a stream buffer. In Blast mode, more than two cache lines are prefetched at a time. In an embodiment of the present invention, in Blast mode, four lines are prefetched, two lines as in Data Prefetch mode, and two additional lines to a stream buffer. The prefetch buffers could be packaged on the processor chip, the cache chip, external chips, or on the memory cards and still be within the scope of the present invention.

In an alternative embodiment of the present invention, in normal mode, data is not prefetched. In Data Prefetch mode, one line is prefetched to a stream buffer. In Blast mode, one line is prefetched to the L1 cache and additional lines are prefetched to stream buffers. In an embodiment of the present invention, three cache lines are prefetched to the stream buffers in Blast Mode.

In an embodiment of the Blast mode, one stream buffer cache line is buffered on the processor chip and the other cache lines of the same stream are buffered on a node controller chip that interfaces to the system bus.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
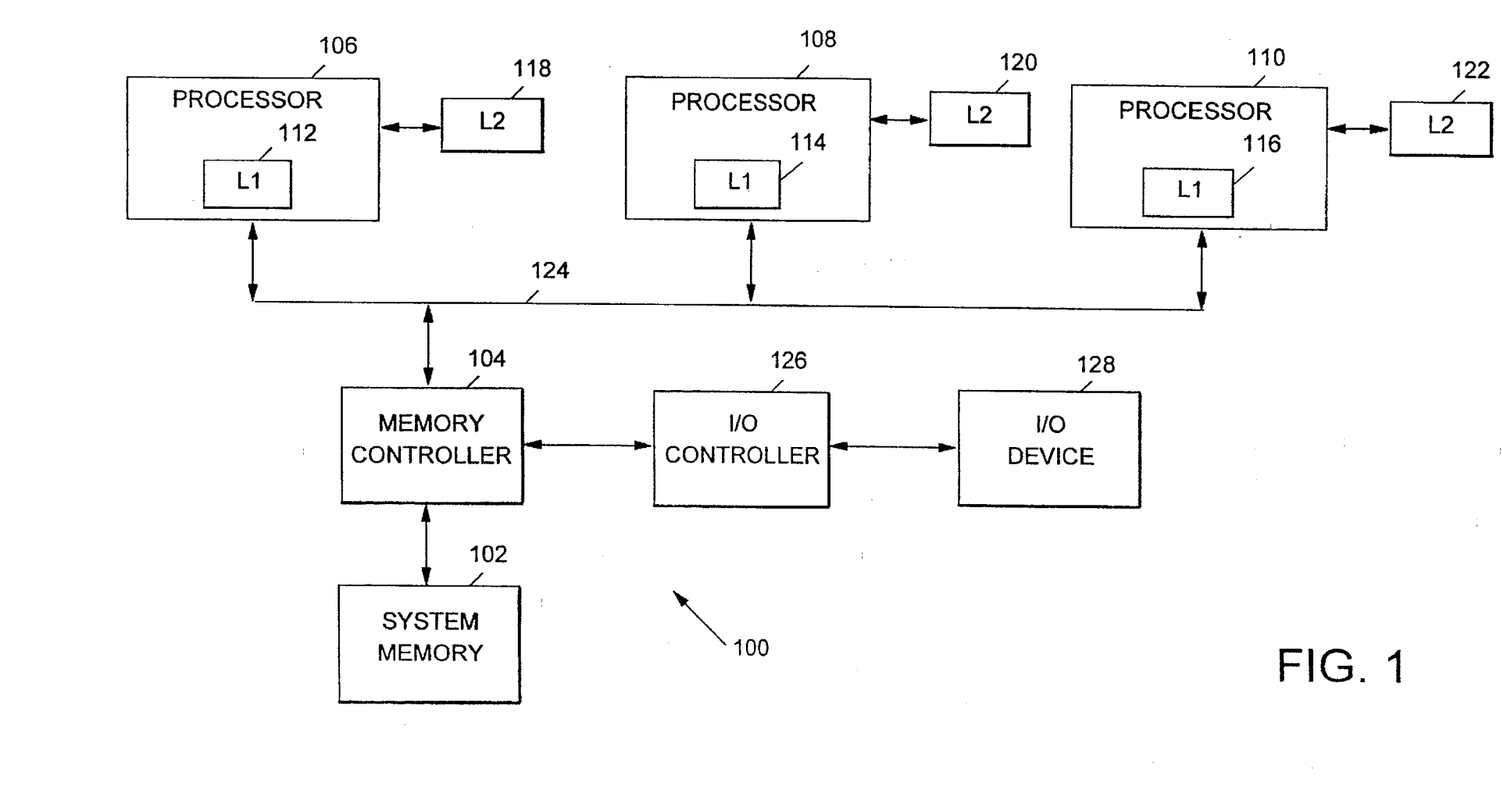
FIG. 1 illustrates a multiprocessor system configurable in accordance with the present invention.

Referring now to FIG. 1, a data processing system which advantageously embodies the present invention will be described. Multiprocessor system 100 includes a number of processing units 106, 108, 110 operatively connected to system bus 124. Note that any number of processing units may be utilized within system 100. Also connected to system bus 124 is memory controller 104, which controls access to system memory 102. Memory controller 104 is also coupled to I/O controller 126, which is coupled to I/O device 128. Processing units 106, 108, 110, I/O controller 126, and I/O device 128 may all be referred to as bus devices herein. As shown, each processor unit 106, 108, 110 may include a processor and L1 caches 112, 114, 116, respectively. The L1 caches may be located on the same chip as the respective processor. Coupled to processing units 106, 108, 110 are L2 caches 118, 120, 122, respectively. These L2 caches are connected to the system bus 124 via the processor to which it is attached.

Each L1 and L2 cache pair are normally serially related. The L1 caches may be implemented as store in or write-through, while the larger and slower L2 cache is implemented as a write-back cache. Both the L1 and L2 cache controllers are physically implemented as part of the processing unit, and are connected via busses internal to the processing unit. The L2 controller could be off chip, and the invention would still apply.

Figure 2:
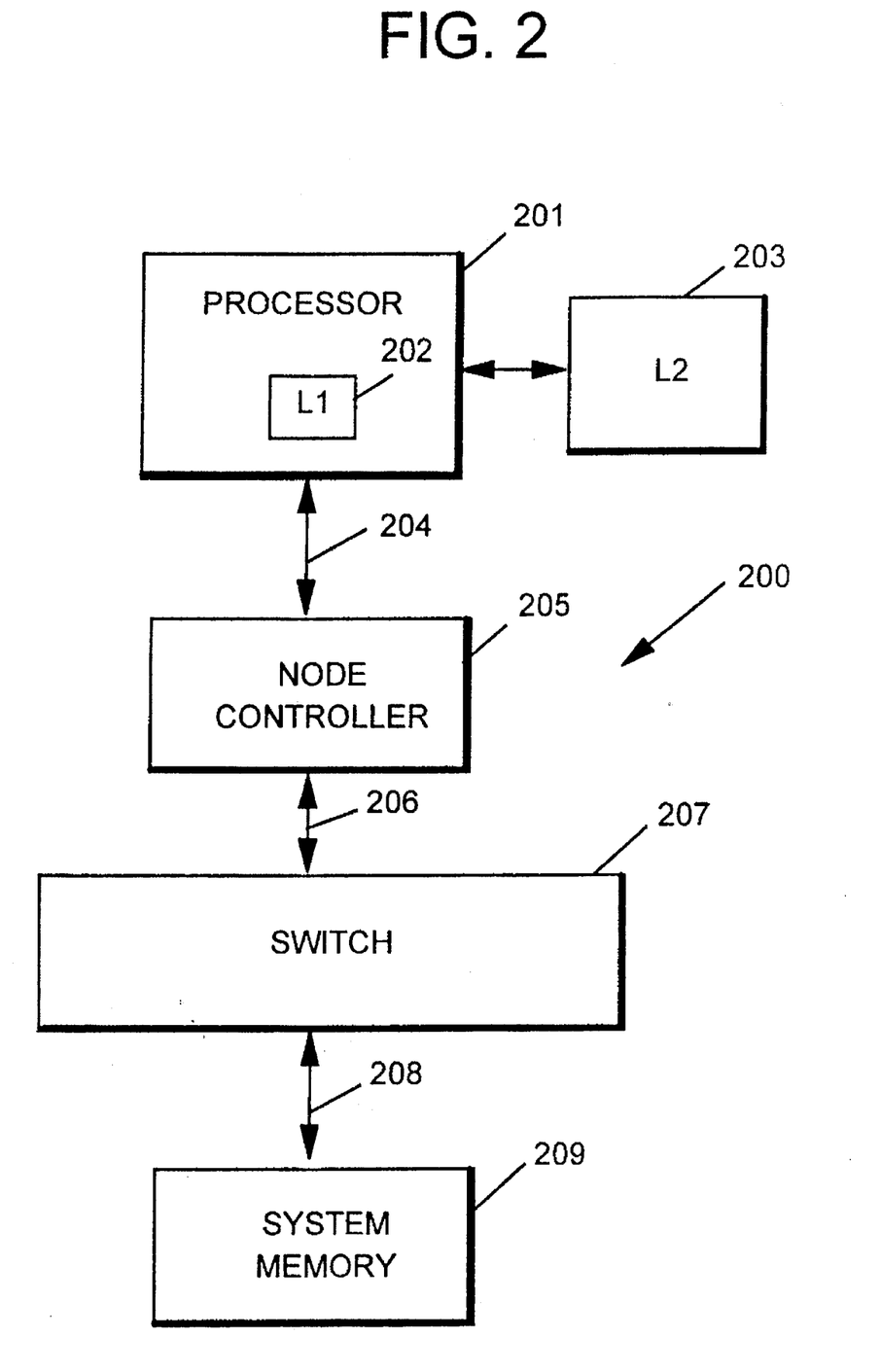
FIG. 2 illustrates a data processing system configurable in accordance with the present invention.

Referring next to FIG. 2, there is illustrated data processing system 200, which may also be configurable to operate in accordance with the present invention. System 200 is an alternative architecture to system 100. Within systems 100 and 200, the basic operation of the processors and caches is similar. The control and functions of memory controller 104 and node controller 205 are similar with respect to the present invention.

In system 200, processor 201 has internal L1 cache 202, which is coupled to external L2 cache 203. Processor 201 is coupled by bus 204 to node controller 205. Node controller 205 performs a basic function known in the art with respect to the coupling of processor 201 to the remainder of system 200. Node controller 205 is coupled by bus 206 to switch 207, which may be a cross-point switch, which is capable of coupling other processors and/or I/O devices to system memory 209 by bus 208. The remainder of the discussion will be with respect to system 200; however, the discussion with respect to the present invention to follow is also relevant and may be embodied within system 100.

A goal of the present invention is to provide for an efficient and accurate technique for prefetching cache lines into L1 cache 202 so that processor 201 hits on these cache lines in L1 cache 202 a significant amount of time, thus minimizing retrievals of address and data information from system memory 209, which degrades the performance of processor 201.

Figure 3:
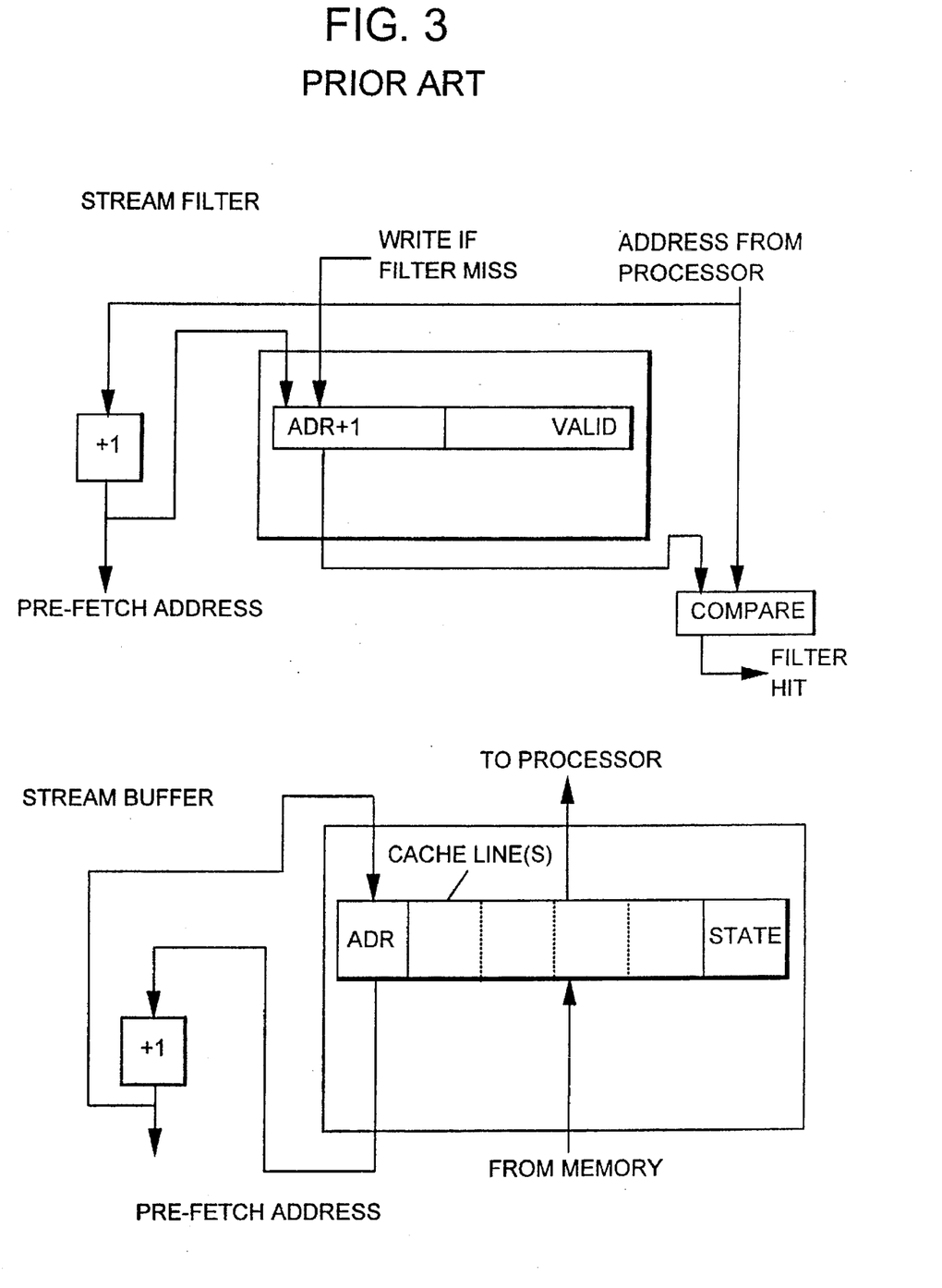
FIG. 3 illustrates a stream filter and a stream buffer.

One prior art technique that has been established to improve the performance of processor operations has been to utilize stream filters and buffers for prefetching of cache lines. Referring next to FIG. 3, stream filters and stream buffers are known in the art. Stream filters are meant to reduce the occurrence of prefetching data that is not used. These filters are history buffers that contain address and direction information. The filter contains the address of a cache line that is the next sequentially higher line from one that missed in the L1 cache. If an access is made to the next higher cache line, a stream condition is detected and a stream buffer is allocated. The filter would be written with line address "X+1" if there was an access to "X." If a subsequent access is made to address "X+1" while "X+1" is still resident in the stream filter, "X+1" is then allocated as a stream.

Stream buffers are prefetch buffers that hold potential cache data. The idea is that if the program executing within the processor is executing a sequential stream of data/instructions, prefetching additional lines into a stream buffer could be useful. Thus, a subsequent cache miss could find the data in the stream buffer.

The stream filter and stream buffers cooperate such that if there is a L1 cache miss that also misses the stream buffers, the miss address is compared against the addresses stored in the stream filter. If there is a hit in the stream filter (meaning that there was a sequential access to sequential lines of data) then there is a good possibility that the next line will also be needed in the future. For a further discussion of stream buffers and stream filters, please refer to *Evaluating Stream Buffers as a Secondary Cache Replacement*, by S. Palacharla and R. Kessler, 1994 IEEE 1063–6879/94, which is hereby incorporated by reference herein.

Figure 4:
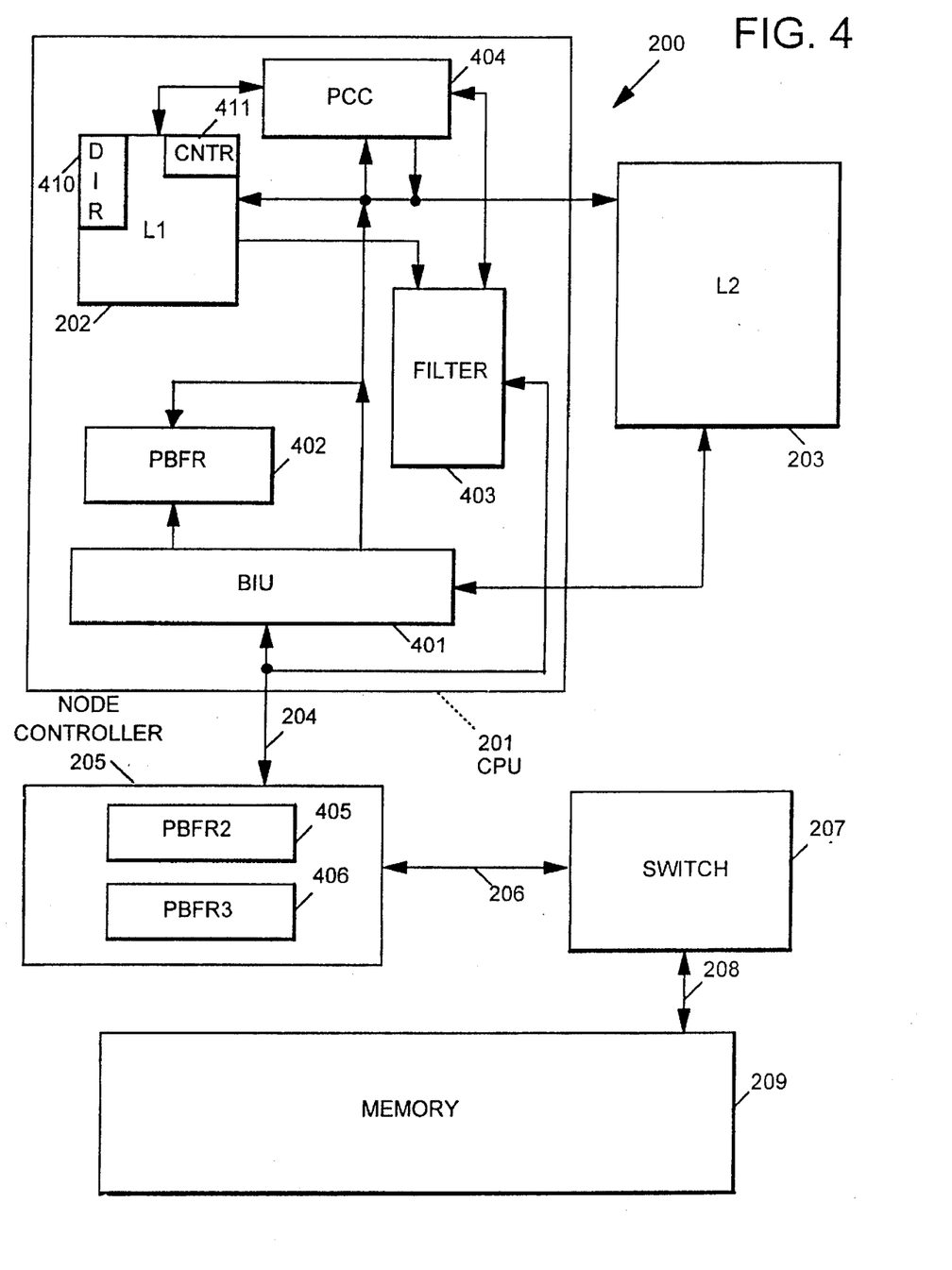
FIG. 4 illustrates a more detailed diagram of the system shown in FIG. 2.

Referring next to FIG. 4, there is illustrated a more detailed diagram of system 200 configured in accordance with the present invention and illustrating a data flow throughout CPU 201. Variations of the flow are known in the art, including the use of separate L1 caches for instructions and data. L1 cache 202 holds frequently used copies of data from memory 209 using any replacement policy known in the art. The larger L2 cache 203 holds more data than L1 cache 202 and ordinarily controls the memory coherency protocol. In the present invention, the data in L1 cache 202 may be a subset of the data in L2 cache 203. L1 cache 202 and L2 cache 203 are "store-in" caches. Other functional elements (including I/O) vie for data using a snoop protocol known in the art. One form of snooping is disclosed within U.S. patent application Ser. No. 08/442,740, which is assigned to a common assignee and is hereby incorporated by reference herein.

The boundary shown for CPU 201 represents a chip boundary and a functional boundary, but is not meant as a restriction on the scope of the invention. PCC 404 is the processor cache controller and controls fetching and storing to the memory subsystem. PCC 404 has other functions that are known in the art, such as the implementation of a directory for L1 cache 202 and the translation of effective addresses to real addresses and vice versa. Prefetch buffer ("PBFR") 402 holds some number of lines of memory data to be staged to CPU 201 and L1 cache 202. PBFR 402 is a stream buffer.

When PCC 404 fetches data, if it is in L1 cache 202 (an L1 hit), it is sent to PCC 404. If it is not in L1 cache 202 (an L1 miss), but it is in L2 cache 203 (an L2 hit), a line of L1 cache 202 is replaced with this subject data from L2 cache 203. In this case, the data is sent simultaneously to L1 cache 202 and PCC 404. If there is a miss in L2 cache 203 as well, the data may be fetched from memory 209 into BIU 401 and loaded simultaneously into L1 cache 202, L2 cache 203, and PCC 404. Variations on this operation are known in the art. Data store operations are similar to the fetch operations except that the data is stored into an L1 line to complete the operation.

Within the following discussion, the various portions of the stream buffer are located in various portions of system 200. In the present implementation, the stream buffer has the ability to store four cache lines, however, any number of cache lines could be implemented within the stream buffer. One cache line of the stream buffer is implemented in L1 cache 202. Essentially, one of the cache lines within L1 cache 202 is utilized for the function of one of the cache lines of the stream buffer. A second cache line of the stream buffer is located in PBFR 402. The other two cache lines of the stream buffer are located in PBFR2 405 and PBFR3 406 within node controller 205. Node controller 205 may be located on a chip downstream from CPU 201 along bus 204. Note, memory controller 104 may contain these stream buffer lines should the architecture of system 100 be utilized.

As discussed within the IEEE article referenced above, the basic operation of a stream filter and stream buffer is that when there is an L1 cache miss on a requested cache line, the address of that cache line is incremented (generally by one address) and this incremented address is inserted into stream filter 403. Upon the occurrence of a subsequent miss of a cache line within L1 cache 202, the address of this L1 cache miss is compared to the addresses contained within filter 403. If a match is observed of addresses, then a stream of cache lines is allocated within the stream buffer.

As noted above, a filter buffer is written with the address of the next sequential cache line when there is a cache miss. The filter contains a number of locations that can hold such addresses comprising a "history" of such events. They may be replaced on a least recently used (LRU) basis. Whenever there is a cache miss, the addresses in a filter are compared with that of the cache line miss. If there is a hit, a filter hit is said to exist and a stream is allocated. In stream mode, an extra cache line(s) is prefetched into the stream buffer in expectation that it will be needed by the L1 cache as part of a stream.

Figure 5:
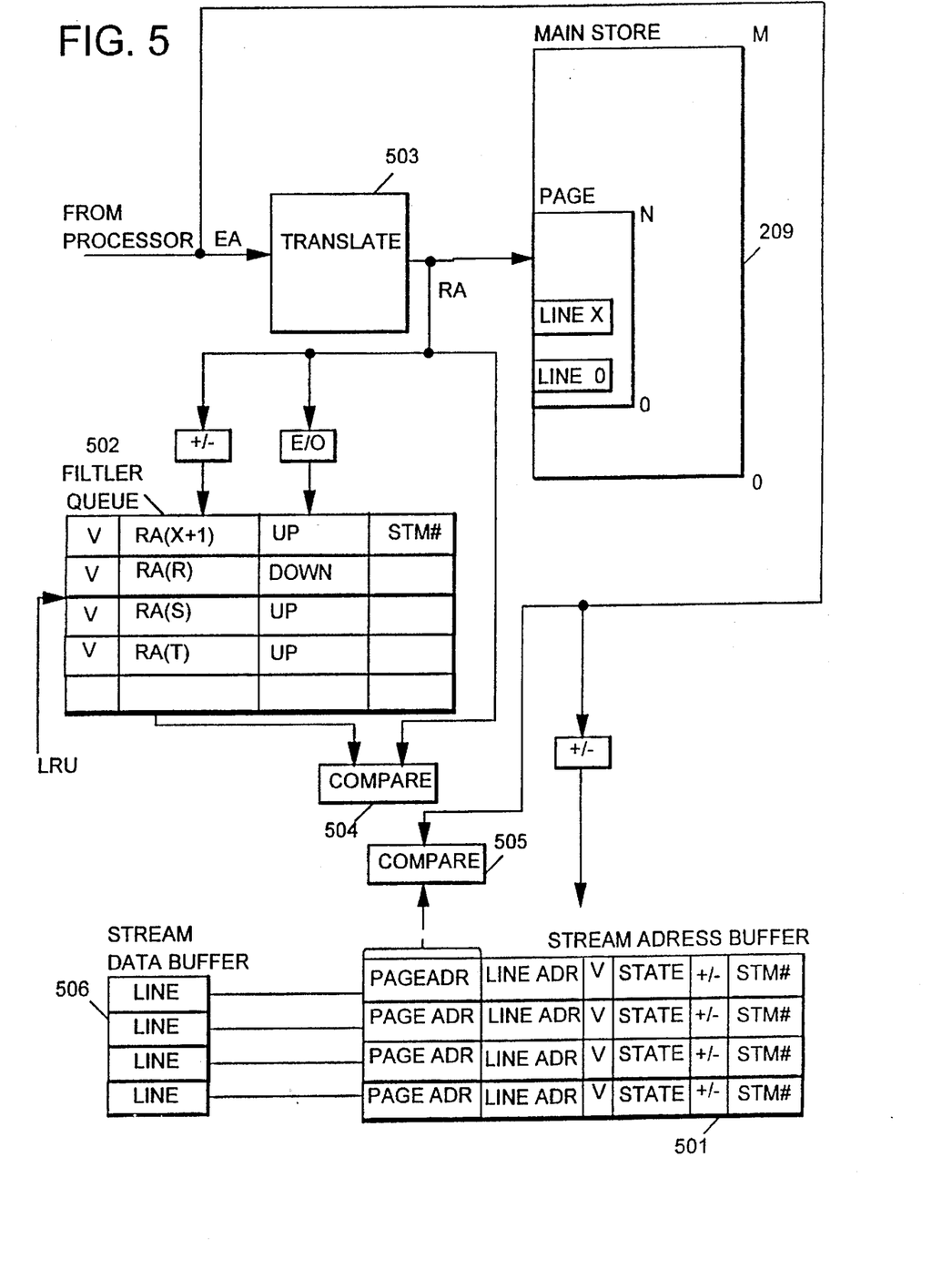
FIG. 5 illustrates a functional diagram in accordance with the present invention.
Figures 6, 6C:
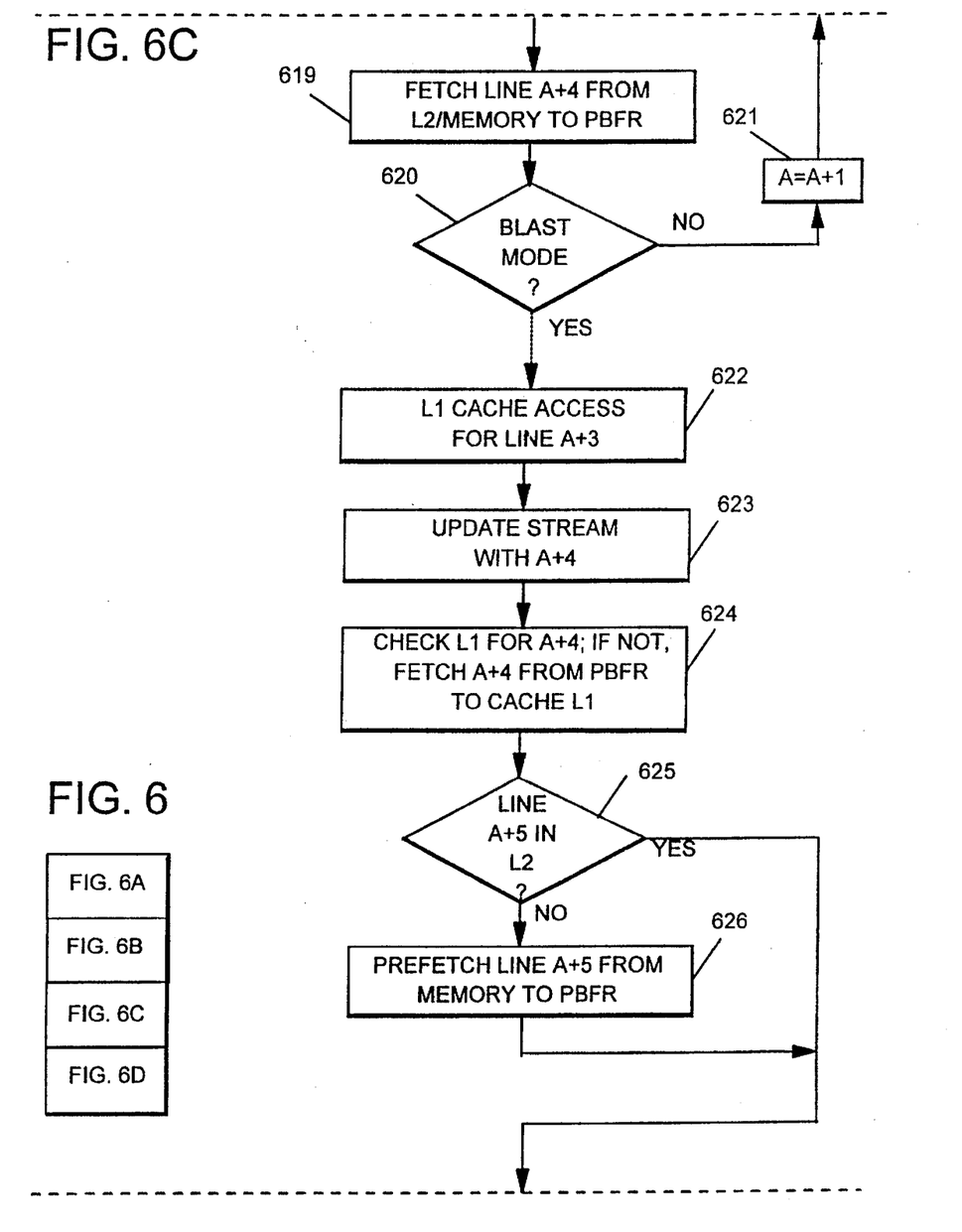
FIGS. 6 and 6A–6D illustrate a flow diagram of the present invention.
Figure 6A:
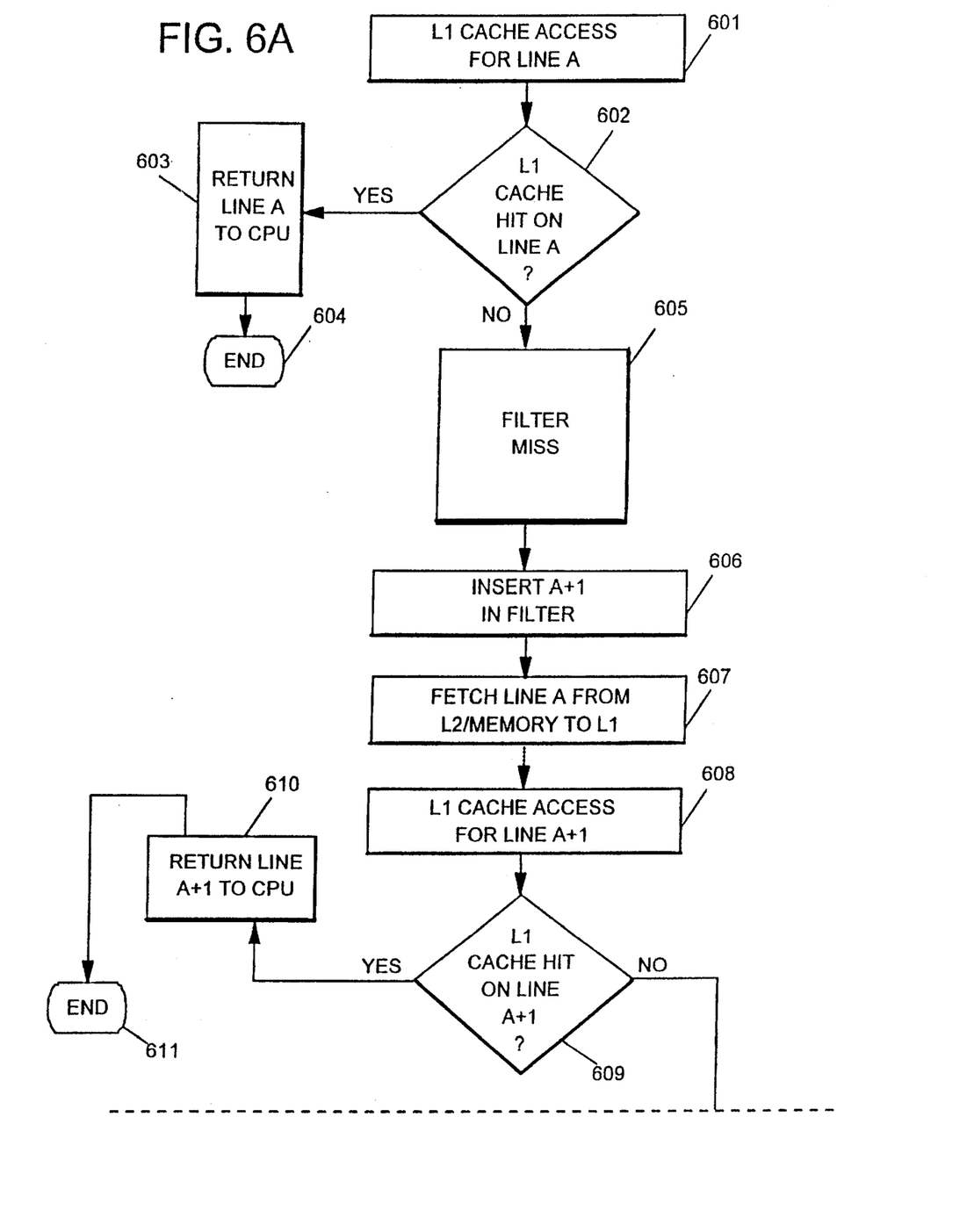
Figure 6B:
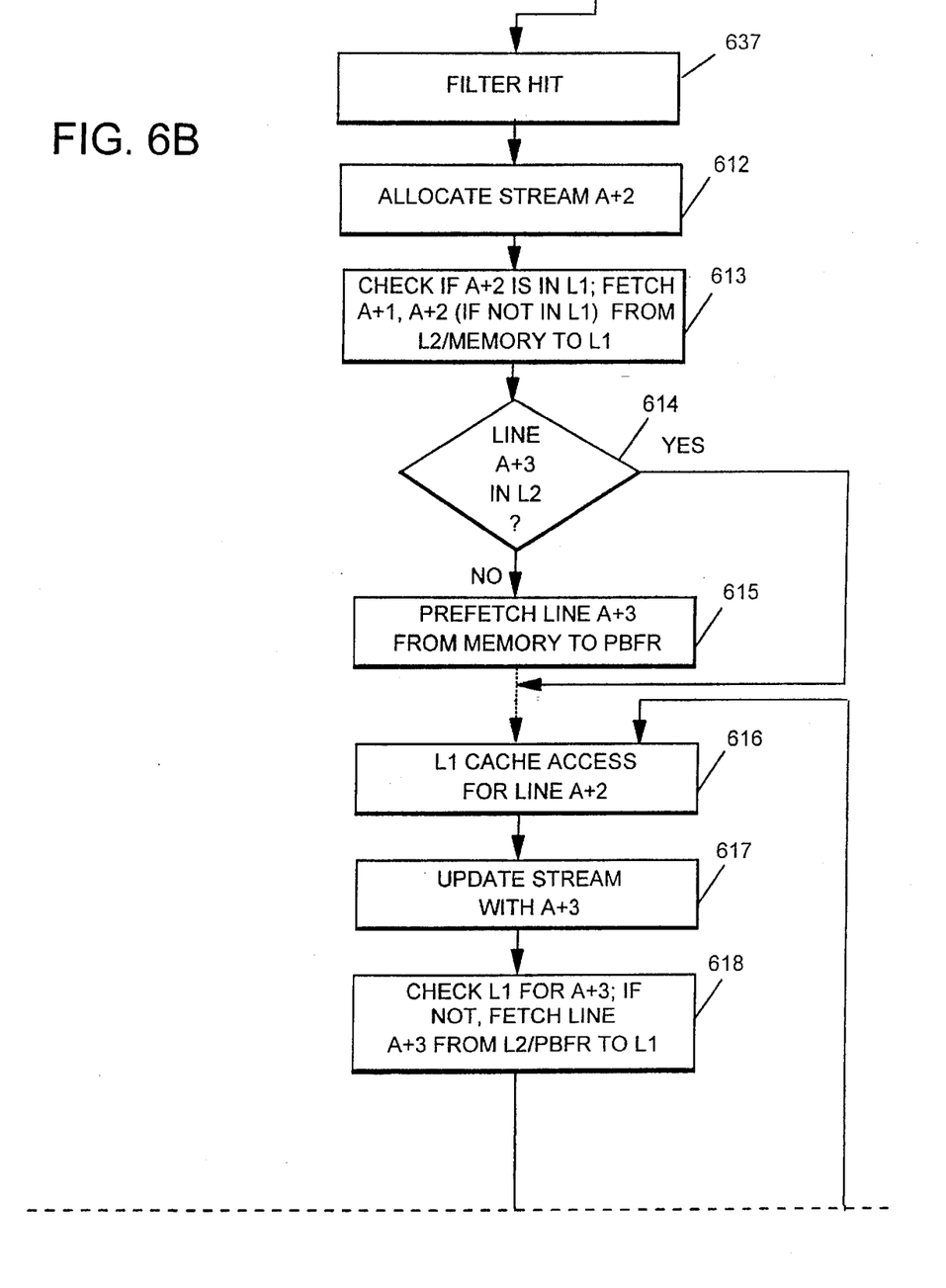
Figure 6D:
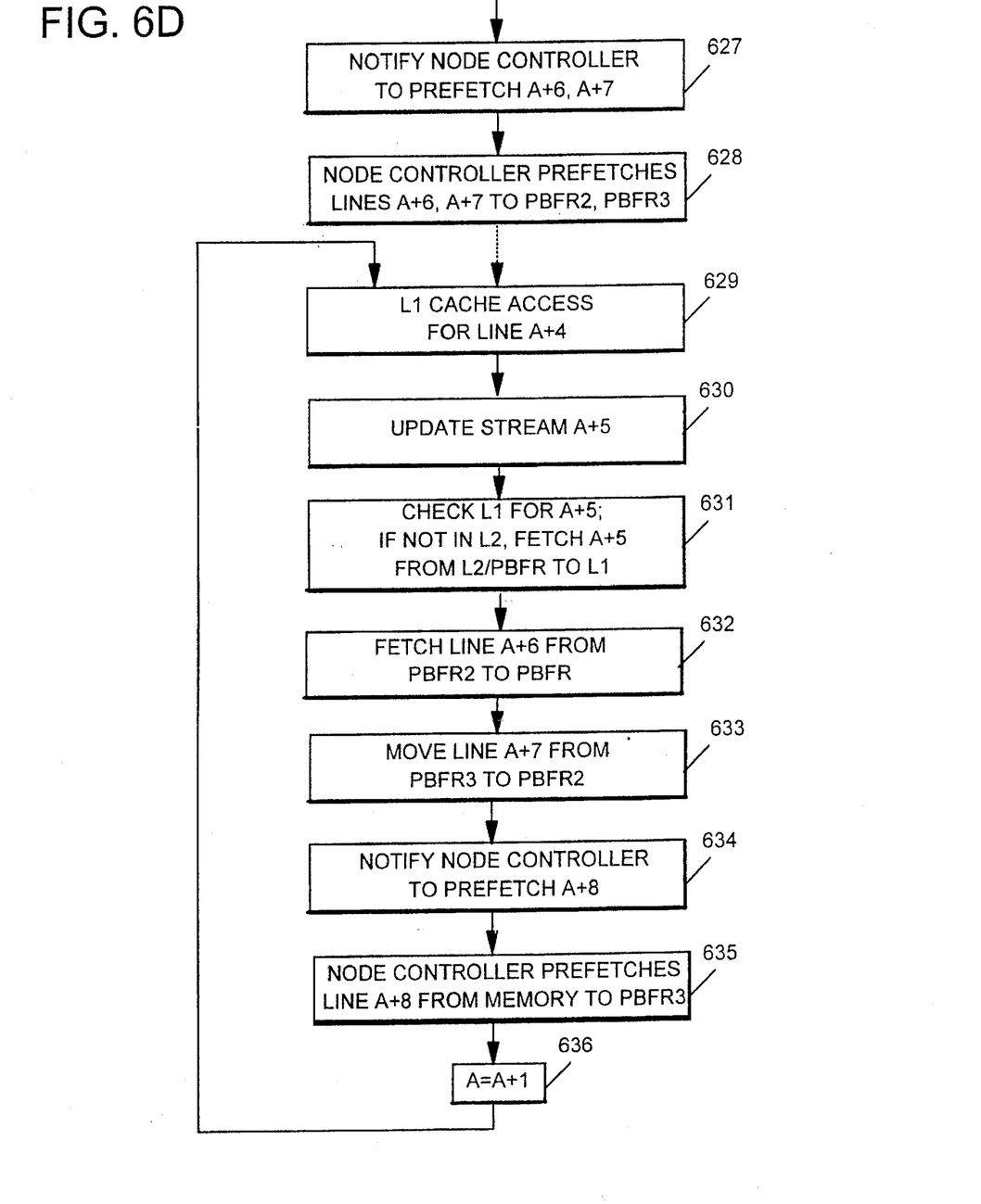

FIG. 5 illustrate a high level functional diagram of the operation of the stream buffer in accordance with the present invention. CPU 201 generates an effective address (EA) according to the architecture used. The EA is the program address potentially with offsets. CPU 201 generates a translated address, or real address (RA) which corresponds to the EA. The real address is used by filter queue 502, but it would be within the scope of the present invention for filter queue 502 to use the effective address as an alternative. The RA is broadside compared with the RA's in filter queue 502; if the entry is valid, as indicated by its valid bit (V), a match is called a filter hit. Filter queue 502 also contains a guessed direction indicator for each entry which indicates that the guessed stream should be incremented or decremented (+/−1 or UP/DOWN). Each filter queue entry also contains a field, which indicates whether there is a stream that corresponds to that address, and if so, the stream number of the stream.

As is well-known, memory 209 is often logically divided into subsections, particularly, memory 209 is divided into pages, which are increments of memory assigned to a program by an operating system and may be used to control "paging" data between DASD (direct access storage device) and memory 209. Pages can be assigned non-sequentially relative to the sequential EA. Therefore, if the EA is used for prefetch of stream data, an address translation must be performed within translator (XLATE) 503 when crossing page boundaries, since the stream buffer contains real addresses, which as mentioned above may not be sequential. Each page is further divided into lines. A line size is determined by the cache implementation and corresponds to the amount of memory data in a cache line. A cache miss will result in a line of data being transferred to the cache.

When there is a filter hit, a stream can be allocated into stream address queue 501 and a corresponding allocation made into stream data buffer 506. The stream address entry contains the guessed effective address of the next line of data for a particular allocated stream. Once again, this is an implementation choice, and the real address could have been used as an alternative. The stream address entry also contains a valid (V) bit which indicates that the stream is allocated. There is also a State field that is used to keep track of the state of the stream. Also, a copy of the guessed direction is kept in the stream buffer. Comparator 505 compares processor EA's with the page and the line addresses contained in stream address queue 501. If there is a match, it is called a stream hit.

The functionality illustrated in FIG. 5 could be implemented in alternative ways and still be within the scope of the present invention.

Memory space within memory 209 may be divided into 128 byte lines. Each line may be divided in half so that the even half of a line is from address 0 to 63, and the odd half is from address 64 to address 127. As described above, CPU 201 generates a logical address (EA), which is translated to a real address to a cachable line in memory. Memory is divided into pages of 2*N bytes. The pages are divided into lines which correspond to a cache entry in size. Each time there is a cache miss, the associated real address is analyzed. If the real address is in the even half of a line, the potential stream is an incrementing one. The LRU filter queue entry within 502 is marked with the direction of "up" and the line miss RA is incremented by "1" and saved in the entry. If the RA is in the odd side of the line, the RA entry in queue 502 is decremented by one and "down" is marked within the entry.

It is within the scope of the present invention as an alternative implementation to save the RA in the filter entry on a miss and compare subsequent misses against the entry to determine the direction of up or down.

It can be seen that when a stream is assigned, the "next" effective line address is saved in stream address buffer 501. Buffer 501 contains an entry for each active stream. A valid "V" bit indicates that the entry is in use, and a direction indicator indicates if the stream is up or down (+\−). A State field is used to indicate the state of the stream. Associated with stream address buffer 501 is stream data buffer 506 which holds prefetched lines of data. Both filter queue 502 and stream buffer 501 predicted addresses are terminated when a page boundary is encountered. This is because such an event requires a new translation.

If there is an L1 cache 202 and L2 cache 203 cache miss, the stream buffer is interrogated before accessing memory 209. It is an obvious embodiment of the present invention to combine the circuits of filter queue 502 and stream address buffer 501.

The prior art with respect to stream filters and stream buffers as described above and within the IEEE article referenced above analyzes the effectiveness of a stream buffer as an L2 cache alternative. In this case, the prefetch is always guessed as incremental. In addition, a stride filter is discussed and shown where the address could be incremented by a "stride" other than one line or word and the stride length saved in the buffer. The stride filter concept could be implemented as an alternative embodiment and be within the scope of the present invention.

Referring next to FIGS. 6A–6D, there is illustrated a flow diagram of the progressive prefetch modes of the present invention. As discussed above, the present invention allows for three progressive prefetch modes: normal, Data Prefetch, and Blast. In normal mode, data is not prefetched. In Data Prefetch mode, two lines are prefetched, one line to the L1 cache and one line to a stream buffer. In Blast mode, more than two lines are prefetched at a time. In a preferred embodiment of the present invention, in Blast mode, four lines are prefetched, two lines as in Data Prefetch mode, and two additional lines to a stream buffer. In any mode, the prefetched buffers could be packaged on the processor chip, the cache chip, external chips or on the memory cards and still be within the scope of the present invention. FIGS. 6A–6D illustrate an example where the direction for guessing in which direction the stream will flow is incrementing. The decrementing example would be an obvious modification of this example. The flow diagram of FIGS. 6A–6D illustrate how the Data Prefetch and Blast modes are entered into.

In step 601, CPU 201 begins to access data starting at cache line A. In step 602, a determination is made whether or not cache line A is within L1 cache 202. If so, the process proceeds to step 603 wherein cache line A is returned to CPU 201 and the process then ends at step 604.

However, if there is a miss on cache line A, the process proceeds to step 605 wherein the address of cache line A is compared to all of the addresses contained within stream filter 403.

As cache line A is not present within filter 403, the process proceeds to step 606, wherein the address of cache line A is incremented by 1 and inserted within filter 403. Thereafter, in step 607, cache line A is fetched from either L2 cache 203 or memory 209 to L1 cache 202. This step is well-known within the art.

The dashed arrow from step 607 to step 608 within FIGS. 6A–6D illustrate that step 608 may or may not occur immediately subsequent to step 607. Generally, as many misses as there are address entries within the stream filter may occur previous to the request for cache line A+1.

At some time later, CPU 201 may request cache line A+1. Again, PCC 404 determines whether or not cache line A+1 is present within L1 cache 202 (step 609). If yes, cache line A+1 is returned to CPU 201 in step 610 and the process ends in step 611. Note that since the cache line A+1 is in L1 cache 202, there is no comparison against stream filter 403, and the A+1 entry remains in filter 403 until it is retired by a filter replacement algorithm, which may be performed in accordance with the teachings in co-pending U.S. patent application Ser. No. (AA9-95-083), which is hereby incorporated by reference herein. However, if there is a miss on cache line A+1 within L1 cache 202, there is a filter hit (step 637), causing the process to proceed to step 612 wherein a stream of cache lines beginning with cache line A+2 is allocated since the address of requested cache line A+1 will be matched with the address A+1 resident within filter 403 resulting in a hit in filter 403. Next, in step 613, cache line A+1 is fetched from either L2 cache 203 or memory 209 to L1 cache 202. Also, L1 cache 202 is checked to determine if cache line A+2 is present. If not present, cache line A+2 is fetched either from L2 cache 203 or memory 209.

Thereafter, in step 614, a determination is made whether or not cache line A+3 resides within L2 cache 203. If not, the process proceeds to step 615, wherein cache line A+3 is prefetched from memory 209 and inserted within prefetch buffer 402. However, if cache line A+3 is resident within cache 203, the process skips step 615.

Again, the dashed arrow line from step 615 to step 616 represents that step 616 may not occur immediately subsequent to step 615.

In step 616, processor 201 may request cache line A+2 resulting in an access for line A+2 to L1 cache 202. Since in step 613, cache line A+2 was fetched into L1 cache 202, L1 cache 202 will be able to supply this cache line to CPU 201. In step 617, the stream addresses within stream address buffer 501 are updated to have address A+3 at the head of the stream. Thereafter, in step 618, L1 cache 202 is checked to determine if cache line A+3 is present; if not, cache line A+3 is fetched from either L2 cache 203 or buffer 402 to L1 cache 202. Next, in step 619, cache line A+4 will be fetched from either L2 cache 203 or memory 209 into prefetch buffer 402.

Thereafter, if Blast mode is not enabled in system 200 (step 620), the process essentially returns to step 616 and loops through steps 616 through 621 as long as CPU 201 continues to increment through the cache lines in the incrementing sequential manner as shown. Step 621 represents that in step 616, there might be an L1 cache access for line A+3, and then in step 617, the stream is updated with address A+3, and in step 618, line A+4 is fetched to L1 cache 202, and in step 619, cache line A+4 is fetched to buffer 402.

The foregoing describes the Data Prefetch mode. If in step 620, Blast mode is enabled in system 200, the process may proceed to step 622 when there is a request from CPU 201 for cache line A+3. In step 622, for such a request, PCC 404 will look within L1 cache 202 for cache line A+3. Since cache line A+3 is resident within L1 cache 202 because of step 618, cache line A+3 will be returned to CPU 201. Thereafter in step 623, the stream addresses within stream address buffer 501 will be updated to A+4. In step 624, L1 cache 202 is checked to determine if line A+4 is present; if not, cache line A+4 will be fetched from buffer 402 to the prefetch buffer position implemented within L1 cache 202.

Thereafter, in step 625, a determination is made whether or not cache line A+5 is resident within L2 cache 203. If so, the process could proceed to either step 626 or step 627. The implementation could require that node controller 205 be notified of every stream buffer access. Limiting the notifications to ones where the next stream buffer line is not in L2 cache 203 and therefore needs to be fetched will cause node controller buffers 405 and 406 to be temporarily out of synchronization with processor 201. The benefit of this design trade-off is that step 626 and 627 can be combined, reducing address bus traffic to node controller 205. Note that in the primary case being covered, none of the A, A+1, etc. lines existed in cache 202 prior to prefetching, so cache line A+5 is not expected to be in L2 cache 203 normally.

When steps 626 and 627 are combined for the reason described above, the notification of step 627 could be implemented with four additional control bits added to the prefetch of step 626. The four bits could be a 1-bit valid prefetch, a 2-bit stream identification, and a 1-bit prefetch direction. Using the address for cache line A+5 and these bits, node controller 205 can generate memory requests for cache lines A+6 and A+7. As stated before, node controller 205 can be implemented to prefetch any number of cache lines. In step 628, node controller 205 will prefetch line A+6 into prefetch buffer PBFR2 405 and will prefetch cache line A+7 into buffer 406 (PBFR3).

The dashed line between steps 628 and 629 indicates the request from CPU 201 for cache line A+4 may not occur immediately subsequent to step 628.

In step 629, L1 cache 202 is accessed for cache line A+4 requested by CPU 201. Since cache line A+4 was inserted into L1 cache 202 in step 624, cache line A+4 will be returned to CPU 201. In step 630, the stream address is incremented to now be headed by address A+5. In step 631, L1 cache 202 is checked to determine if cache line A+5 is present; if not, cache line A+5 is fetched from either L2 cache 203 or buffer 402 into L1 cache 202.

Thereafter, in step 632, cache line A+6 is moved from buffer 405 to buffer 402. In step 633, cache line A+7 is moved from buffer 406 to buffer 405. Thereafter, in step 634, node controller 205 is notified to prefetch cache line A+8. In this implementation, the fetch of cache line A+6 is step 632 is the notification to node controller 205 to prefetch cache line A+8 (step 634). In step 635, node controller 205 prefetches cache line A+8 from memory 209 into buffer 406.

Thereafter, as long as CPU 201 continues accessing cache lines in an incremental sequential manner (i.e., CPU 201 continues accessing cache lines within the allocated stream) the process will continue looping through steps 629–636 in an incremental manner (step 636).

Within the foregoing discussion, bus interface unit (BIU) 401 may perform the fetching of cache lines from memory 209.

Node controller 205 may be a port on switch 207.

Because effective addresses are continuous across page boundaries and real addresses are not, it is often advantageous to utilize effective addresses when comparing two addresses within the stream address buffer 501. In addition, because of the foregoing, a counter may be used to produce incremental addresses.

As noted above, control bits may be utilized within a fetch from BIU 401 to memory 209 to notify node controller 205 that it is to prefetch cache lines into buffers 405 and 406. One bit may inform node controller 205 that this particular line request requires that node controller 205 perform a prefetch into its buffers. Another two bits may inform node controller 205 of which stream numbers are associated with the prefetch. Another bit may indicate which direction in a cache line the addresses are heading. Node controller 205 when notified to perform a prefetch may perform such a prefetch independently of the operation of CPU 201.

When maintaining inclusion with respect to L1 cache 202 and L2 cache 203, when a cache line is moved up into L1 cache 202 from buffer 402 within the foregoing procedure, the same cache line will also be included within L2 cache 203.

An advantage in having one of the stream buffer lines within L1 cache 202 is that when that particular cache line included within that buffer line in L1 cache 202 is requested by processor 201, a hit occurs within L1 cache 202 and not a miss. Technically, a miss would occur even though a requested cache line is included within a separate buffer attached to the L1 cache 202. Because of such a miss, extra hardware and cycle time would be required to retrieve that cache line from that stream buffer line into CPU 201. It could be said that the cache line within L1 cache 202 acting as one of the stream buffer cache lines is included within the prefetch stream buffer in logical terms.

Although the present invention and its advantages have been described in detail, it should be understood that various changes, substitutions and alterations can be made herein without departing from the spirit and scope of the invention as defined by the appended claims.

What is claimed is:

1. A method for prefetching data to be possibly used by a data processor in a data processing system, said method comprising the steps of:

(a) receiving a request from said processor for a line of data;

(b) allocating a stream in response to said request, wherein a head of said stream resides in a primary cache coupled to said processor, and wherein subsequent lines of said stream reside in a stream buffer, wherein some of said lines of said stream do not reside in said primary cache;

(c) receiving subsequent requests from said processor for lines of data represented by elements within said stream; and (d) controlling a depth of prefetching of not-yet-requested lines of data as a function of said subsequent requests from said processor for lines of data represented by elements within said stream.

2. The method as recited in claim 1, further comprising the step of:

controlling a direction of prefetching of not-yet-requested lines of data as a function of said subsequent requests from said processor for lines of data represented by elements within said stream.

3. The method as recited in claim 1, wherein step (d) further comprises the steps of:

in a first mode of operation, prefetching two lines of data for each request from said processor for a line of data represented by one of said elements within said stream; and in a second mode of operation, prefetching more than two lines of data for each request from said processor for a line of data represented by one of said elements within said stream, wherein said first mode of operation is entered into before said second mode of operation.

4. The method as recited in claim 1, wherein said stream is maintained in a stream filter.

5. The method as recited in claim 4, wherein one or more lines of data are prefetched speculatively into one or more buffers external to said processor.

6. The method as recited in claim 4, wherein said primary cache resides on a chip with said processor.

7. A system for prefetching cache lines from main memory to a stream buffer serving a processor coupled by a bus to said main memory, said system comprising:

a stream filter;

a cache coupled to said processor;

means for receiving a first request from said processor for a first cache line;

means for allocating a stream in said stream filter in response to said first request, said stream having a content dependent upon an address of said first cache line;

means for receiving a second request from said processor for a second cache line, wherein an address of said second cache line is contained within said stream;

means for speculatively prefetching N (where N is an integer greater than zero) cache lines from said memory into said stream buffer in response to said second request, wherein addresses of said N prefetched cache lines lie along said stream; and means for receiving a third request from said processor for a third cache line, wherein an address of said third cache line is contained within said stream;

means for speculatively prefetching M (where M is an integer greater than N) cache lines from said memory into said stream buffer in response to said third request, wherein addresses of said M prefetched cache lines lie along said stream, wherein at least one line, but not all lines, within said stream buffer is contained within said cache, wherein a head of said stream resides within said cache.

8. The system as recited in claim 7 wherein said means for speculatively prefetching N cache lines is associated with a first mode of operation of said system and said means for speculatively prefetching M cache lines is associated with a second mode of operation of said system, and wherein said first mode of operation is entered into before said second mode, and wherein said second mode of operation can be disabled.

9. The system as recited in claim 7 whereto one or more lines of said stream buffer are contained off of a chip containing said processor.

10. A method for speculatively prefetching cache lines requested by a processor from a memory, said method comprising the steps of:

receiving a request from said processor for a first cache line;

determining if said first cache line is contained within a cache coupled to said processor;

if said first cache line is not contained within said cache coupled to said processor, determining if an address of said first cache line is matched by an address contained within a stream filter;

if said address of said first cache line is not matched by said address contained within said stream filter, incrementing said address of said first cache line to create a first incremented address, and inserting said first incremented address in said stream filter;

fetching said first cache line from said memory to said cache;

receiving a request from said processor for a second cache line, wherein an address of said second cache line corresponds to said first incremented address;

determining if said second cache line is contained within said cache;

if said second cache line is not contained within said cache, incrementing said first incremented address to create a second incremented address, and allocating a stream of addresses in said stream filter, wherein a head of said stream has an address that corresponds to said second incremented address;

fetching from said memory to said cache said second cache line and a third cache line having an address corresponding to said second incremented address;

fetching from said memory to a first line in a stream buffer a fourth cache line having an address corresponding to a third incremented address, wherein said third incremented address corresponds to an increment of said second incremented address;

receiving a request from said processor for said third cache line;

updating said stream so that said head of said stream has an address that corresponds to said third incremented address;

fetching said fourth cache line from said first line of said stream buffer to said cache;

fetching from said memory to said first line of said stream buffer a fifth cache line having an address corresponding to a fourth incremented address, wherein said fourth incremented address corresponds to an increment of said third incremented address;

receiving a request from said processor for said fourth cache line;

updating said stream so that said head of said stream has an address that corresponds to said fourth incremented address;

fetching said fifth cache line from said first line of said stream buffer to said cache;

fetching from said memory to said first line of said stream buffer a sixth cache line having an address corresponding to a fifth incremented address, wherein said fifth incremented address corresponds to an increment of said fourth incremented address;

fetching from said memory to a second line of said stream buffer a seventh cache line having an address corresponding to a sixth incremented address, wherein said sixth incremented address corresponds to an increment of said fifth incremented address;

fetching from said memory to a third line of said stream buffer an eighth cache line having an address corresponding to a seventh incremented address, wherein said seventh incremented address corresponds to an increment of said sixth incremented address;

receiving a request from said processor for said fifth cache line;

updating said stream so that said head of said stream has an address that corresponds to said fifth incremented address;

fetching said sixth cache line from said first line of said stream buffer to said cache;

fetching said seventh cache line from said second line of said stream buffer to said first line of said stream buffer;

fetching said eighth cache line from said third line of said stream buffer to said second line of said stream buffer; and fetching a ninth cache line from said memory to said third line of said stream buffer.

11. The method as recited in claim 10 wherein said cache is a primary cache associated with said processor.

* * * * *